(12) United States Patent
Minami

(10) Patent No.: US 9,638,110 B2
(45) Date of Patent: May 2, 2017

(54) NATURAL GAS ENGINE AND OPERATION METHOD FOR NATURAL GAS ENGINE

(71) Applicant: ISUZU MOTORS LIMITED, Tokyo (JP)

(72) Inventor: Toshitaka Minami, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 39 days.

(21) Appl. No.: 14/648,023

(22) PCT Filed: Nov. 8, 2013

(86) PCT No.: PCT/JP2013/080279
§ 371 (c)(1),
(2) Date: Jun. 23, 2015

(87) PCT Pub. No.: WO2014/084024
PCT Pub. Date: Jun. 5, 2014

(65) Prior Publication Data
US 2015/0315986 A1 Nov. 5, 2015

(30) Foreign Application Priority Data

Nov. 30, 2012 (JP) ................................. 2012-262544

(51) Int. Cl.
*F02M 21/02* (2006.01)
*F02D 19/10* (2006.01)
(Continued)

(52) U.S. Cl.
CPC ........... *F02D 19/10* (2013.01); *F01N 3/0231* (2013.01); *F01N 3/0293* (2013.01); *F01N 3/032* (2013.01);
(Continued)

(58) Field of Classification Search
CPC ...... F01N 3/031; F01N 3/035; F01N 2240/20; F01N 2240/36; F01N 2410/00;
(Continued)

(56) References Cited

U.S. PATENT DOCUMENTS 3,016,886 A   1/1962   Benz et al.
5,035,206 A   7/1991   Welch et al.
(Continued)

FOREIGN PATENT DOCUMENTS

CA   2 442 336 A1   12/2003
EP   1 260 684 A2   11/2002
(Continued)

OTHER PUBLICATIONS

Patent Abstracts of Japan, Publication No. 8-158980, published Jun. 18, 1996.
(Continued)

*Primary Examiner* — Jorge Leon, Jr.
(74) *Attorney, Agent, or Firm* — Staas & Halsey LLP

(57) ABSTRACT

A natural gas engine equipped with a mechanism that introduces exhaust gas into a cylinder during an intake stroke, and in which an amount of diesel fuel injected into a cylinder is set to a diesel fuel amount for idling condition across an entire operating region of an engine, engine output is increased or decreased by increasing or decreasing an amount of a natural gas fuel, and fuel injection of the diesel fuel into a cylinder is performed using multi-injection in a high load region in which the accelerator opening degree is greater than a preset first opening degree.

14 Claims, 9 Drawing Sheets

(51) Int. Cl.
| | |
|---|---|
| *F01N 3/032* | (2006.01) |
| *F01N 3/029* | (2006.01) |
| *F01N 3/20* | (2006.01) |
| *F01N 3/28* | (2006.01) |
| *F01N 3/035* | (2006.01) |
| *F01N 3/023* | (2006.01) |
| *F01N 13/00* | (2010.01) |
| *F02D 41/30* | (2006.01) |
| *F01N 3/031* | (2006.01) |
| *F02D 19/06* | (2006.01) |
| *F02D 21/08* | (2006.01) |
| *F01N 3/10* | (2006.01) |
| *F01N 5/04* | (2006.01) |
| *F02D 9/04* | (2006.01) |
| *F02D 13/02* | (2006.01) |
| *F02D 41/08* | (2006.01) |
| *F02D 41/00* | (2006.01) |
| *F02M 26/05* | (2016.01) |
| *F02M 26/23* | (2016.01) |
| *F02M 26/01* | (2016.01) |

(52) U.S. Cl.
CPC ........... *F01N 3/035* (2013.01); *F01N 3/106* (2013.01); *F01N 3/2053* (2013.01); *F01N 3/2892* (2013.01); *F01N 13/009* (2014.06); *F01N 13/0093* (2014.06); *F02D 19/105* (2013.01); *F02D 41/005* (2013.01); *F02D 41/0027* (2013.01); *F02M 21/0215* (2013.01); *F01N 3/031* (2013.01); *F01N 3/101* (2013.01); *F01N 5/04* (2013.01); *F01N 2240/20* (2013.01); *F01N 2240/36* (2013.01); *F01N 2260/04* (2013.01); *F01N 2410/00* (2013.01); *F01N 2410/03* (2013.01); *F01N 2410/06* (2013.01); *F01N 2560/026* (2013.01); *F01N 2560/06* (2013.01); *F02D 9/04* (2013.01); *F02D 13/0246* (2013.01); *F02D 13/0273* (2013.01); *F02D 19/0647* (2013.01); *F02D 21/08* (2013.01); *F02D 41/0025* (2013.01); *F02D 41/08* (2013.01); *F02D 41/3094* (2013.01); *F02D 2200/602* (2013.01); *F02M 26/01* (2016.02); *F02M 26/05* (2016.02); *F02M 26/23* (2016.02); *Y02T 10/22* (2013.01); *Y02T 10/32* (2013.01); *Y02T 10/36* (2013.01); *Y02T 10/44* (2013.01); *Y02T 10/47* (2013.01)

(58) Field of Classification Search
CPC .... F02D 19/0647; F02D 19/10; F02D 19/105; F02D 41/0025; F02D 41/005; F02D 41/3094; Y02T 10/36; Y02T 10/44
USPC ......... 60/274, 278, 287, 288, 297, 299, 311, 60/324; 123/27 GE, 526
See application file for complete search history.

(56) References Cited

U.S. PATENT DOCUMENTS

| | | | |
|---|---|---|---|
| 6,230,683 | B1 | 5/2001 | zur Loye et al. |
| 2001/0017127 | A1* | 8/2001 | Flynn ................ F02B 1/12 123/435 |
| 2002/0020388 | A1 | 2/2002 | Wright et al. |
| 2002/0078918 | A1* | 6/2002 | Ancimer ............ F02B 1/12 123/295 |
| 2002/0174648 | A1 | 11/2002 | Minami |
| 2005/0224060 | A1 | 10/2005 | Hill et al. |
| 2009/0120385 | A1 | 5/2009 | Munshi et al. |
| 2009/0266345 | A1 | 10/2009 | Sasaki et al. |
| 2012/0160221 | A1 | 6/2012 | Munshi et al. |
| 2012/0266846 | A1 | 10/2012 | Kilbourne |
| 2012/0310509 | A1 | 12/2012 | Pardo et al. |
| 2013/0213363 | A1 | 8/2013 | Pruemm |
| 2014/0034024 | A1* | 2/2014 | Nakajima ......... F02D 19/0647 123/472 |
| 2014/0069384 | A1* | 3/2014 | Suzuki ............... F02D 41/403 123/445 |
| 2015/0315986 | A1 | 11/2015 | Minami |

FOREIGN PATENT DOCUMENTS

| | | | | |
|---|---|---|---|---|
| EP | 1 939 422 | A1 | 7/2008 | |
| EP | 2 136 059 | A1 | 12/2009 | |
| EP | 2 700 803 | A1 | 2/2014 | |
| EP | 2 708 722 | A1 | 3/2014 | |
| GB | 967268 | | 8/1964 | |
| JP | 8-158980 | | 6/1996 | |
| JP | 2002-349241 | | 12/2002 | |
| JP | 3959600 | B2 * | 8/2007 | ........... F02D 41/005 |
| JP | 2012-57471 | | 3/2012 | |
| JP | WO 2012157041 | A1 * | 11/2012 | ........... F02D 41/403 |
| WO | 01/86128 | A2 | 11/2001 | |
| WO | 2012/021990 | A1 | 2/2012 | |
| WO | WO 2012/144051 | A1 | 10/2012 | |
| WO | WO 2012/157041 | A1 | 11/2012 | |

OTHER PUBLICATIONS

Patent Abstracts of Japan, Publication No. 2012-57471, published Mar. 22, 2012.
International Search Report mailed Feb. 18, 2014, in corresponding International Application No. PCT/JP2013/080279.
Extended European Search Report dated Aug. 5, 2016 in corresponding European Patent Application No. 13858654.0.
International Search Report mailed on Dec. 24, 2013 in International Patent Application No. PCT/JP2013/080278.
Extended European Search Report dated Jul. 14, 2016 in European Patent Application No. 13858625.0.
Office Action for U.S. Appl. No. 14/646,963, issued Dec. 23, 2016.
U.S. Appl. No. 14/646,963, filed May 22, 2015, Toshitaka Minami, Isuzu Motors Limited.

* cited by examiner

NATURAL GAS ENGINE AND OPERATION METHOD FOR NATURAL GAS ENGINE

CROSS-REFERNCE TO RELATED APPLICATIONS

This application is a U.S. National Stage Application, which claims the benefit under 35 U.S.C. §371 of PCT International Patent Application No. PCT/JP2013/080279, filed Nov. 8, 2013, which claims the foreign priority benefit under 35 U.S.C. §119 of Japanese Patent Application No. 2012-262544, filed Nov. 30, 2012, the contents of which are incorporated herein by reference.

TECHNICAL FIELD

The present invention relates to a natural gas engine including a high-efficiency combustion system for combusting natural gas fuel by compression ignition using a hypergolic fuel source such as diesel oil without the use of a spark ignition system, and also relates to an operation method for a natural gas engine.

BACKGROUND ART

As shown in FIG. 9, in a natural gas engine (CNG engine) 10X according to a conventional technology, natural gas fuel C compressed by a piston 63 is ignited by spark ignition using an ignition plug 62 provided in a cylinder head 61, and the natural gas fuel C is combusted.

The natural gas fuel C is injected into intake air A by a natural gas fuel jet injector (natural gas fuel injection device) 35 provided in an intake system passage 65 communicated with a combustion chamber 64 formed between the cylinder head 61 and the top of the piston 63, and is taken into the combustion chamber 64 together with the intake air A during an intake stroke in which an intake valve 66 is opened. The natural gas fuel C is ignited by electric spark of the ignition plug 62 disposed in the upper center of the combustion chamber 64. Although just an image, the combustion propagates in layers as indicated by thin lines. Then, combustion gas generated by the combustion does its work while pressing down the piston 63 during an expansion stroke involving expansion of the combustion gas. Thereafter, the combustion gas (exhaust gas) G is discharged into an exhaust system passage 67 during an exhaust stroke in which a next exhaust valve 68 is opened.

In the case of a small engine with low output or a small cylinder bore (cylinder hole) diameter or in the case of an engine in which the natural gas fuel C is readily combusted by lean combustion in a high oxygen region, the natural gas fuel C is combusted by such layered combustion so as to spread all over the combustion chamber 64 from approximately the center of the combustion chamber 64. Thus, the force pressing down the piston 63 becomes uniform, and pressing force Fp is directed along the central axis of the piston 63 as a whole. As a result, the piston 63 is smoothly reciprocated.

However, in the case of a large engine with high output or a large cylinder bore diameter, high-temperature combustion gas G flows out toward the exhaust system passage 67 in the engine 10X. Meanwhile, since low-temperature intake air A flows into the intake system passage 65, the temperature on the exhaust system passage 67 side gets higher than that on the intake system passage 65 side. Particularly, a portion H indicated by cross-hatching in FIG. 10 is likely to be heated to a high temperature. For this reason, the natural gas fuel C is ignited by contacting with the high-temperature portion H before entering a combustion stroke, rather than being ignited by ignition of the ignition plug 62, resulting in a phenomenon called detonation (abnormal combustion) in which the combustion propagates all over the combustion chamber 64 from the high-temperature portion H side. When such a phenomenon occurs, the combustion propagates all over the combustion chamber 64 from one of the corners thereof. For this reason, the force pressing down the piston 63 becomes non-uniform, and the pressing force Fp is directed obliquely to the central axis direction of the piston 63 as a whole. As a result, the piston 63 partially hits against the cylinder 70, and can no longer be smoothly reciprocated, leading to engine trouble. The detonation is one of the causes of knocking.

Meanwhile, when the exhaust gas is subjected to aftertreatment using a three-way catalyst, in order to reduce NOx in the exhaust gas, an exhaust gas treatment device carrying the three-way catalyst is provided in an exhaust passage to reduce and remove NOx in the exhaust gas. As to the three-way catalyst, catalyst performance thereof is lowered in an air-fuel ratio lean region with much oxygen. Thus, the three-way catalyst is preferably in an air-fuel ratio rich region with low oxygen concentrations in the exhaust gas. Therefore, inside the cylinder, stoichiometric combustion (combustion with a stoichiometric ratio: complete combustion that leaves no oxygen after combustion) or rich combustion (combustion close to the stoichiometric ratio and with low oxygen concentrations) is performed. Thus, the stoichiometric combustion is performed in the cylinder by controlling the amount of intake air into the cylinder using an intake throttle valve provided in the intake passage and supplying intake air with an oxygen level required and sufficient to combust the natural gas fuel.

Since an air-fuel mixture of the intake air A and the natural gas fuel C is not readily combusted, unlike lean combustion, also in such a case of stoichiometric combustion or rich combustion, the combustion starts from the high-temperature portion H on the exhaust system passage 67 side, making the detonation likely to occur.

As described above, considering higher output and increase in size of the natural gas engine or rich combustion therein, the detonation problem needs to be resolved. It is also required to resolve a problem of heat damage to the ignition plug, in which the ignition plug is damaged by heat in an ignition plug ignition system. Meanwhile, when there is one ignition plug for spark ignition, only one ignition source makes it difficult to perform reliable ignition for each cycle, leading to a problem of poor combustion efficiency. Such poor combustion efficiency requires a large amount of fuel to obtain a desired engine output, resulting in an increase in amount of heat to be generated. As a result, various durability problems are likely to occur, such as fuel consumption, heat damage to an electrode portion of the ignition plug and heat damage to exhaust system parts.

As measures against such problems, there has been proposed a fuel control device for an internal combustion engine as described in Japanese patent application Kokai publication No. 2012-57471, for example. In the fuel control device, CNG (natural gas) fuel is injected into an intake passage by a CNG injector (CNG fuel injection device) and diesel oil is injected into a combustion chamber by a diesel oil injector (diesel fuel injection device). By mixing the CNG fuel with the diesel oil having high compression ignition properties, the CNG is combusted using the diesel oil as an ignition source. Moreover, a ratio of the CNG to the diesel oil is changed based on the maximum pressure during combustion in a combustion chamber.

As shown in FIG. 11, in a natural gas engine 10Y that simultaneously uses such diesel fuel, diesel fuel f is injected by a diesel fuel jet injector (diesel fuel injection device) 69 during a compression stroke to compress an air-fuel mixture of natural gas fuel C and intake air A. Then, as the fuel spreads inside the combustion chamber 64, the temperature of the air-fuel mixture is increased by adiabatic compression of the air-fuel mixture. When the temperature of the air-fuel mixture exceeds an ignition temperature of the diesel oil, the diesel fuel f starts to be combusted by compression ignition, and the natural gas fuel C around the ignition source is also combusted. At this combustion start point, the diesel fuel f is spreading inside the combustion chamber 64. Thus, multipoint ignition can prevent ignition from an exhaust system high-temperature portion. Accordingly, combustion is performed in the entire combustion chamber 64, and thus approximately uniform force is applied to the top of the piston 63. Therefore, pressing force Fp pressing down the piston 63 is set approximately in a central axis direction of the piston 63. Thus, the piston 63 is smoothly reciprocated. Accordingly, in the engine using both the diesel fuel and the natural gas fuel, detonation can be prevented. Also, since no ignition plug is used, no heat damage to the ignition plug occurs.

However, the natural gas engine simultaneously using the diesel fuel also has the following problem. Specifically, as shown in FIG. 12, compared with a diesel engine according to a conventional technology, which is operated with an excess air ratio $\lambda$ of 2 to 8, an intake air amount is significantly reduced in a natural gas engine in which stoichiometric combustion is performed with an excess air ratio $\lambda$ of 1. As a result, the compression pressure in the cylinder is lowered, and the temperature rise of the air-fuel mixture in the cylinder by the adiabatic compression is also reduced. Particularly, in the case of a low load operation region with a small engine output (horsepower), when the intake air amount is reduced to maintain the stoichiometric combustion, with reduction in fuel, the compression pressure in the cylinder is significantly lowered, leading to a problem of unstable combustion. Such a problem needs to be resolved.

With regard to such problems, the inventors of the present invention have proposed a diesel engine including an exhaust gas purification device for the purpose of reliably and continuously combusting PM collected by a DPF in a wide operation region of the diesel engine, as described in Japanese patent application Kokai publication No. 2002-349241. In the diesel engine, an exhaust cam is formed in two stages including an exhaust gas introduction cam, or an exhaust gas introduction valve is provided and an exhaust gas introduction mechanism is provided to introduce exhaust gas into a cylinder during an intake stroke. When an exhaust temperature range is a low temperature range, an intake shutter, an exhaust shutter and the exhaust gas introduction mechanism are operated to increase the exhaust gas temperature (in-cylinder temperature).

The diesel engine described above is an engine using only diesel oil as fuel, but is an engine capable of stably igniting the fuel in the cylinder, even when an intake air amount is reduced by an intake throttle valve in a low load operation condition of the engine, by using the exhaust gas introduction mechanism that increases the in-cylinder temperature by causing some of the exhaust gas in the exhaust passage to flow back into the cylinder during the intake stroke of the engine.

PRIOR ART DOCUMENT

Patent Document 1: Japanese patent application Kokai publication No. 2012-57471
Patent Document 2: Japanese patent application Kokai publication No. 2002-349241

SUMMARY OF THE INVENTION

In consideration of the above situations, the inventors of the present invention have conceived the present invention by acquiring the knowledge that the above problems of the natural gas engine can be resolved by incorporating the exhaust gas introduction mechanism to introduce exhaust gas into the cylinder during the intake stroke into the natural gas engine.

It is an object of the present invention to provide a natural gas engine and an operation method for the natural gas engine, which are capable of igniting natural gas fuel in a reliable and stable manner across the entire operating region, performing highly efficient combustion using a small amount of fuel and a small amount of intake air, and minimizing knocking resulting from detonation even when the engine operation condition is in a high load region in an engine including a natural gas fuel injection device that injects diesel fuel serving as an ignition source into a combustion chamber and injects natural gas fuel into an intake system passage.

A natural gas engine according to the present invention to achieve the above object includes an exhaust gas introduction mechanism that introduces exhaust gas into a cylinder during an intake stroke in a natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel injected into the cylinder without the use of a spark ignition system. The natural gas engine also includes a control device that performs control such that the amount of diesel fuel injected into the cylinder is set to the diesel fuel amount for idling across the entire operating region except for the start-up of the natural gas engine, engine output is increased or decreased by increasing or decreasing the amount of the natural gas fuel, and fuel injection of the diesel fuel into the cylinder is performed using multi-injection in a high load region in which the accelerator opening degree is greater than a preset first opening degree.

Note that the exhaust gas introduction mechanism described above can adopt any of the following configurations, which are already well-known technologies. As one of the configurations, in an exhaust cam that actuates an exhaust valve, an exhaust gas introduction cam profile having a phase angle of approximately 90° is formed in addition to a normal cam profile that opens the exhaust valve during a normal exhaust stroke. The exhaust gas introduction cam profile can be actuated according to an engine operation condition. Thus, by lifting and opening the exhaust valve by about 1 mm to 3 mm during the intake stroke, the inside of a cylinder and an exhaust system passage are communicated with each other to introduce the exhaust gas during the intake stroke.

As the other configuration, an exhaust gas introduction valve using an electromagnetic solenoid to actuate an on-off valve is provided separately from the exhaust valve, and a drive signal is given to the electromagnetic solenoid according to the engine operation condition. Thus, by lifting and opening the exhaust gas introduction valve during the intake stroke, the inside of the cylinder and the exhaust system passage are communicated with each other to introduce the exhaust gas during the intake stroke.

Note that the present invention does not have to be limited to the above two configurations, but may adopt a configuration having a function to introduce the exhaust gas into the cylinder during the intake stroke, besides the configurations described above.

According to the configurations described above, the operation of the exhaust gas introduction mechanism can introduce high-temperature exhaust gas into the cylinder immediately after combustion by allowing the high-temperature exhaust gas in the exhaust system passage to appropriately flow back into the cylinder during the intake stroke. Thus, the temperature of an air-fuel mixture of diesel fuel, natural gas fuel, intake air and exhaust gas inside the cylinder can be increased. Compared with EGR gas introduction in which the temperature is lowered through an EGR passage including an EGR cooler, the exhaust gas introduction described above significantly increases the effect of increasing an in-cylinder temperature, since the high-temperature exhaust gas immediately after combustion is introduced.

As a result, stable compression combustion can be performed even with a small amount of diesel fuel, and the natural gas fuel can also be combusted in a stable manner using the combustion of the diesel fuel as an ignition source. Accordingly, stable combustion with high combustion efficiency can be realized. Moreover, since the amount of diesel fuel required for ignition is reduced, only a small amount of diesel fuel to be consumed is required. Furthermore, an amount of heat generated by combustion of the fuels is reduced as a whole. As a result, the amount of heat propagated to the exhaust system passage is reduced, leading to reduction in heat damage caused by the heat. Thus, durability of exhaust system parts in the engine is improved.

Moreover, the operation of the exhaust gas introduction mechanism can quickly increase an in-cylinder temperature even at the start-up when the engine is still cold. Thus, startability is improved. Also, at the start-up of the engine, the engine can be started with a small amount of diesel fuel. Thus, accidental fires and unburned hydrocarbon (unburned HC) emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel is readily ignited even during a low load operation condition, thus enabling stable ignition with a small amount of diesel fuel. Since stable combustion can be performed with a small amount of fuels, ride quality (drivability) can be improved while reducing engine vibration. Also, the amount of exhaust gas can be reduced during the low load condition.

In a diesel engine including the exhaust gas introduction mechanism and using diesel fuel, stable combustion can be maintained in an idling condition from the beginning. Thus, the use of the combustion of the diesel fuel for the ignition of the natural gas fuel enables reliable compression ignition of the diesel fuel and also enables the natural gas fuel to be combusted with the minimum amount of intake air and high combustion efficiency, regardless of the amount of natural gas fuel, through a very simple control in which the diesel fuel amount is constant compared with a control in which a ratio of the natural gas fuel to the diesel fuel is changed according to the engine operation region. Note that a opening degree of the intake throttle valve in this case is controlled by measuring the air-fuel ratio, excess air ratio λ and oxygen concentrations in the exhaust gas, and determining a stoichiometric ratio for stoichiometric combustion.

Therefore, since the intake air amount is small with respect to the ratio of the amount of the fuels, the exhaust gas temperature can be increased. Thus, exhaust gas purification performance of the exhaust gas purification device (aftertreatment device) provided in the exhaust passage can be improved. Moreover, since the intake air amount is small, the exhaust gas amount is also reduced. Accordingly, only a low capacity is required for the exhaust gas purification device, and thus a compact size can be realized.

Furthermore, in the high load region in which the accelerator opening degree is greater than a preset first opening degree, as shown in FIG. 7, fuel injection of the diesel fuel into the cylinder is performed using multi-injection. Thus, dispersion of the diesel fuel inside the combustion chamber is improved. As a result, uniform ignition is also performed. Thus, knocking and the like resulting from detonation can be minimized. Note that the first opening degree is a value within a range of 85% to 95%, preferably 90%, of the full opening of the accelerator opening degree.

Note that, as for the multi-injection and combination of pilot injection and main injection, the injection amount is set approximately the same, as shown in FIG. 8, in the multi-injection, as opposed to the pilot injection and main injection in which the fuel injection amount varies. Moreover, while the number of split injections is 2 in the combination of pilot injection and main injection, the number of split injections is 2 to 5, preferably 3 to 5 in the multi-injection.

In the natural gas engine described above, in a low load region in which the accelerator opening degree is smaller than a preset second opening degree, the control device performs control for actuating the exhaust gas introduction mechanism to introduce the exhaust gas into the cylinder during the intake stroke, and performs control for narrowing the exhaust shutter provided in the exhaust system passage.

More specifically, in the low load region as shown in FIG. 7, misfire is likely to occur since the in-cylinder temperature is low. Therefore, control for actuating the exhaust gas introduction mechanism to introduce the exhaust gas into the cylinder during the intake stroke is performed. Thus, the exhaust gas can be taken into the cylinder during the intake stroke. At the same time, exhaust throttle control using the exhaust shutter can increase the pressure in the exhaust system passage on the upstream side of the exhaust shutter. Thus, the exhaust gas on the exhaust system passage side can readily flow back into the cylinder.

As a result, occurrence of misfire can be prevented by increasing the amount of exhaust gas to be taken into the cylinder during the intake stroke and thus increasing the in-cylinder temperature. Note that the second opening degree is a value within a range of 25% to 35%, preferably 30%, of the full opening of the accelerator opening degree.

In the natural gas engine described above, the control device performs control such that, when the natural gas fuel to be injected into the intake system passage falls short, the injection of the natural gas fuel into the intake system passage is stopped and the natural gas engine is operated by performing fuel injection of only the diesel fuel into the cylinder with a fuel amount and injection timing based on diesel combustion data.

More specifically, when the natural gas tank becomes empty and the natural gas fuel falls short, the natural gas engine can be driven as a diesel engine with only the diesel fuel, based on the diesel combustion data. Therefore, a vehicle mounting the natural gas engine can move using the diesel fuel even when the natural gas fuel falls short. Thus, even if filling up of the natural gas tank is forgotten, the vehicle can be supplied with the natural gas fuel by moving to the supply source of the natural gas fuel. Therefore, the vehicle can move to a broader area rather than within an area where a facility capable of supplying the natural gas fuel is provided.

In the natural gas engine described above, the control device is configured to perform control such that, at the start-up of the natural gas engine, the natural gas engine is started using only the diesel fuel. At the start-up, in general, the in-cylinder temperature is low, making it difficult to perform ignition. Thus, unburned natural gas fuel can be prevented from being emitted into the exhaust system passage. Note that more fuel may be required at the start-up than during idling condition. In such a case, the amount of the diesel fuel is increased while setting the amount of the natural gas fuel to zero, as an exception, rather than increasing the amount of the natural gas fuel.

In the natural gas engine described above, a bypass passage is provided in the exhaust system passage as a bypass of the exhaust passage, a first DPF device is disposed in the exhaust system passage on the downstream side of a junction of the bypass passage and the exhaust system passage, the first DPF device being configured using a DPF carrying an oxidation catalyst or a continuous regeneration DPF obtained by combining an oxidation catalyst device and a DPF, a second DPF device is disposed in the bypass passage, the second DPF device being configured using a DPF carrying an oxidation catalyst or a continuous regeneration DPF obtained by combining an oxidation catalyst device and a DPF, and an exhaust channel switching mechanism is provided to switch the flow of the exhaust gas between the bypass passage and the exhaust passage. The control device performs control such that the exhaust channel switching mechanism allows the exhaust gas to flow through the bypass passage at the start-up of the natural gas engine, during idling condition or in a low load region in which the accelerator opening degree is smaller than a preset third opening degree, and, in other cases, prevents the exhaust gas from flowing through the bypass passage. With such a configuration, by selectively using the first DPF device and the second DPF device, the PM in the exhaust gas can be more efficiently collected. Note that the third opening degree is a value within a range of 15% to 25%, preferably 20%, of the full opening of the accelerator opening degree.

In this case, the capacity of the DPF provided in the bypass passage can be reduced to realize a compact size. Therefore, the compact DPF can be disposed in a high-temperature portion closer to the engine main body. Thus, the amount of PM generated by diesel combustion in the exhaust gas emitted into the atmosphere can be reduced. Note that, in a high load operation condition with a high exhaust temperature, the exhaust gas is controlled to pass through a high-capacity DPF with a catalyst on the downstream side, which is provided in the exhaust passage, rather than through the bypass passage. Thus, exhaust resistance is small, and soot is purified.

Note that the natural gas engine described above adopts a configuration in which intake throttle control using an intake shutter provided in the intake system passage is simultaneously performed during the operation of the exhaust gas introduction mechanism. With such a configuration, the intake air amount (fresh air amount) can be reduced to an amount that enables stoichiometric combustion by actuating the intake shutter in a closing direction to reduce the intake air, together with the operation of the exhaust gas introduction mechanism, and the pressure on the intake system passage side can be lowered. Thus, the exhaust gas can be allowed to more efficiently flow back into the cylinder. As a result, the in-cylinder temperature can be further increased, and the combustion efficiency can be further improved.

Note that, in the diesel engine according to the conventional technology, in which diesel oil is combusted, no intake shutter (intake throttle valve) is provided, since lean combustion is usually performed. However, in the present invention, the intake shutter is provided to further increase the thermal efficiency, since the intake air amount needs to be reduced to perform stoichiometric combustion or rich combustion of the natural gas fuel. The intake shutter is used to assist the exhaust gas introduction into the cylinder.

The operation method for the natural gas engine according to the present invention to achieve the above object is an operation method for a natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel injected into the cylinder without the use of a spark ignition system, the natural gas engine including an exhaust gas introduction mechanism that introduces exhaust gas into the cylinder during an intake stroke. In the method, the amount of diesel fuel injected into the cylinder is set to the diesel fuel amount for idling across the entire operating region except for the start-up of the natural gas engine, engine output is increased or decreased by increasing or decreasing the amount of the natural gas fuel, and fuel injection of the diesel fuel into the cylinder is performed using multi-injection in a high load region in which the accelerator opening degree is greater than a preset first opening degree.

Also, in the operation method for the natural gas engine described above, in a low load region in which the accelerator opening degree is smaller than a preset second opening degree, control for actuating the exhaust gas introduction mechanism to introduce the exhaust gas into the cylinder during the intake stroke is performed, and control for narrowing the exhaust shutter provided in the exhaust system passage is performed.

Moreover, in the operation method for the natural gas engine described above, when the natural gas fuel to be injected into the intake system passage falls short, the injection of the natural gas fuel into the intake system passage is stopped and the natural gas engine is operated by performing fuel injection of only the diesel fuel into the cylinder with a fuel amount and injection timing based on diesel combustion data.

Furthermore, in the operation method for the natural gas engine described above, at the start-up of the natural gas engine, the natural gas engine is started using only the diesel fuel.

Moreover, in the operation method for the natural gas engine described above, a bypass passage is provided in the exhaust system passage as a bypass of the exhaust passage, a first DPF device is disposed in the exhaust system passage on the downstream side of a junction of the bypass passage and the exhaust system passage, the first DPF device being configured using a DPF carrying an oxidation catalyst or a continuous regeneration DPF obtained by combining an oxidation catalyst device and a DPF, a second DPF device is disposed in the bypass passage, the second DPF device being configured using a DPF carrying an oxidation catalyst or a continuous regeneration DPF obtained by combining an oxidation catalyst device and a DPF, and an exhaust channel switching mechanism is provided to switch the flow of the exhaust gas between the bypass passage and the exhaust passage. The control device performs control such that the exhaust channel switching mechanism allows the exhaust gas to flow through the bypass passage at the start-up of the natural gas engine, during idling condition or in a low load region in which the accelerator opening degree is smaller than a preset third opening degree, and, in other cases, prevents the exhaust gas from flowing through the bypass passage.

The operation method for the natural gas engine described above can achieve the same effects as those achieved by the natural gas engine described above.

According to the natural gas engine and the operation method for the natural gas engine according to the present invention, the operation of the exhaust gas introduction mechanism can increase the temperature of the air-fuel mixture of diesel fuel, natural gas fuel, intake air and exhaust gas inside the cylinder, since high-temperature exhaust gas immediately after combustion can be allowed to flow back during an intake stroke to be taken into the cylinder. Thus, stable compression combustion is performed even with a small amount of diesel fuel, and the natural gas fuel can also be combusted in a stable manner. Accordingly, stable combustion can be realized. In addition, knocking resulting from detonation can be minimized even when the engine operation condition is in a high load region.

As a result, combustion efficiency is improved, and the amount of the diesel fuel required for ignition is reduced. Thus, only a small amount of diesel fuel f is required. Moreover, an amount of heat generated by combustion of the fuels is reduced as a whole. As a result, the amount of heat propagated to the exhaust system passage is reduced, leading to reduction in heat damage and improvement in durability.

DETAILED DESCRIPTION

Figure 1:
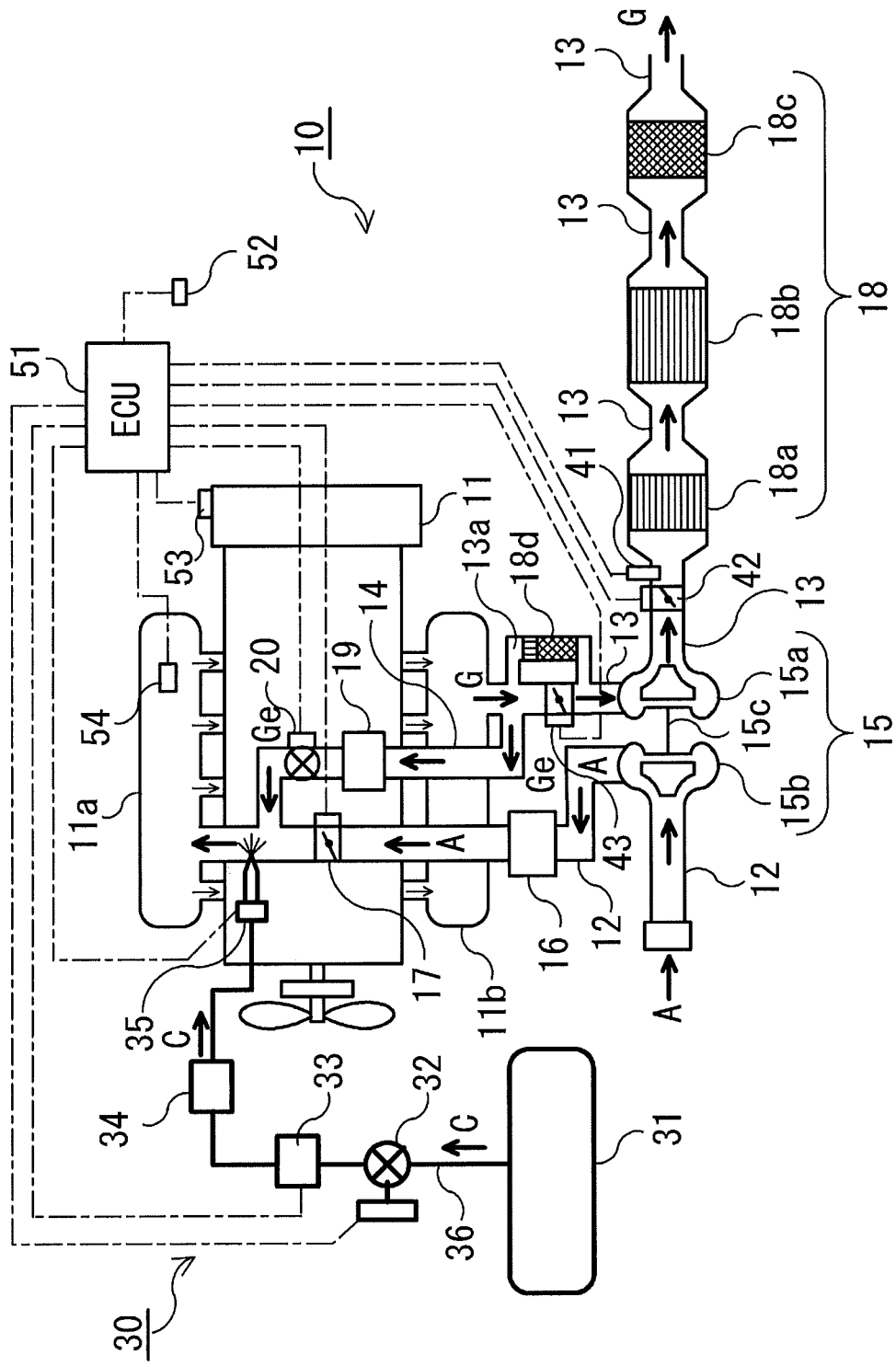
FIG. 1 is a diagram schematically showing a configuration of a natural gas engine according to an embodiment of the present invention.

With reference to the drawings, description is given below of a natural gas engine and an operation method for the natural gas engine according to an embodiment of the present invention. In a natural gas engine 10 according to the embodiment of the present invention shown in FIGS. 1 and 4, an intake passage (intake system passage) 12 is connected to an intake manifold (intake system passage) 11a of an engine main body 11, an exhaust passage (exhaust system passage) 13 is connected to an exhaust manifold (exhaust system passage) 11b thereof, and an EGR passage 14 is provided, which connects the exhaust passage 13 to the intake passage 12.

There is also provided a turbo supercharger (turbocharger) 15. A turbine 15a of the turbo supercharger 15 is provided in the exhaust passage 13, and a compressor 15b thereof is provided in the intake passage 12. Through a shaft 15c connecting the turbine 15a with the compressor 15b, rotation of the turbine 15a rotated by exhaust energy of exhaust gas G is transmitted to the compressor 15b. Thus, the compressor 15b compresses intake air A.

In the intake passage 12, through which the intake air A passes, the compressor 15b, an intercooler 16 and an intake shutter (intake throttle) 17 are provided. The intake air A is compressed by the compressor 15b and cooled by the intercooler 16 to have its air density increased. Then, the intake air A is introduced into a combustion chamber 64 in a cylinder 70 shown in FIG. 4 after a flow rate thereof is controlled by the intake shutter 17.

Also, as shown in FIG. 1, in the exhaust passage 13, through which the exhaust gas G generated by combustion of diesel fuel f and natural gas fuel C passes, the turbine 15a and an exhaust gas purification device (aftertreatment device) 18 including a three-way catalyst 18a, an oxidation catalyst 18b, a DPF with a catalyst (diesel particulate filter: first DPF) 18c and the like, are provided. Also, an exhaust shutter (exhaust throttle) 42 is provided between the turbine 15a and the exhaust gas purification device 18. Moreover, some of the exhaust gas G is introduced into the EGR passage 14 as EGR gas Ge as needed, and the rest thereof is purified by the exhaust gas purification device 18 and emitted into the atmosphere after driving the turbine 15a.

Furthermore, in the EGR passage 14, through which the EGR gas Ge passes, an EGR cooler 19 that cools the EGR gas Ge and an EGR valve 20 that controls a flow rate of the EGR gas Ge are provided. After diverging from the exhaust passage 13, the EGR gas Ge is cooled by the EGR cooler 19, controlled by the EGR valve 20 for its flow rate, and then recirculated into the intake passage 12.

Figure 4:
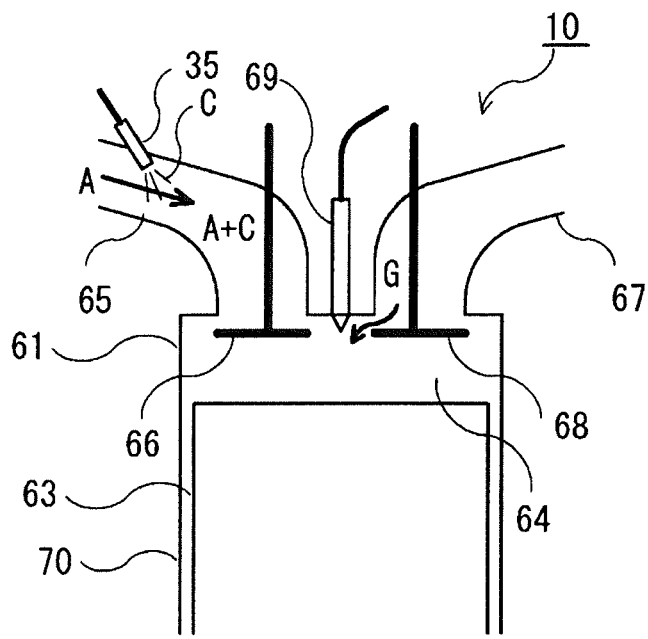
FIG. 4 is a diagram for explaining exhaust gas introduction.

The natural gas engine 10 described above includes a diesel fuel supply line (not shown) to inject the diesel fuel f into the cylinder in the engine main body 11, as in the case of a diesel engine. Therefore, as in the case of a general diesel engine, the diesel fuel f is injected into the cylinder 70 from a diesel fuel injector (diesel fuel injection device) 69 as shown in FIG. 4.

Moreover, as for the engine main body 11 as well as a fuel injection system, a cooling system, and the like, the present invention includes the configuration of the general diesel engine. In addition to such a configuration, the present invention includes a natural gas supply system 30 including a natural gas tank (CNG tank) 31, an electromagnetic valve 32, a pressure regulating device (regulator) 33, a chamber 34, a CNG jet injector (natural gas fuel injection device) 35 disposed on the downstream side of the intake shutter 17 in the intake passage 12, and a CNG pipe 36 connecting those described above, as shown in FIG. 1.

With the natural gas supply system 30, the natural gas fuel C stored in the natural gas tank 31 passes through the CNG pipe 36 and is regulated by the pressure regulating device (regulator) 33 through the electromagnetic valve 32 for its pressure. Then, while being controlled for its injection amount and injection timing by the CNG jet injector 35, the natural gas fuel C is injected into an intake system passage 65 (the intake passage 12 in FIG. 1).

Furthermore, in the present invention, when igniting the natural gas fuel C, the natural gas fuel C is combusted by compression ignition of the diesel fuel f injected into the combustion chamber 64 in the cylinder 70 without the use of a spark ignition system. Moreover, the present invention includes an exhaust gas introduction mechanism (not shown) that introduces the exhaust gas G into the cylinder 70 during an intake stroke.

Figure 5:
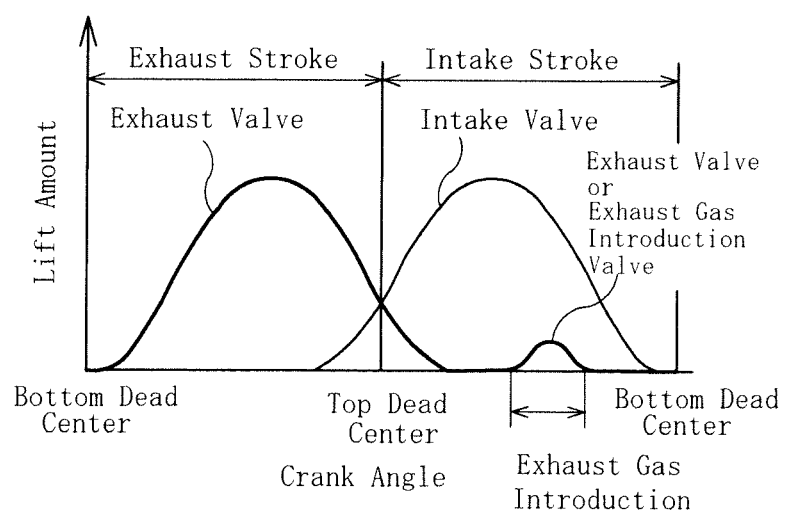
FIG. 5 is a diagram showing lifting of an intake valve and an exhaust valve during the exhaust gas introduction.

As the exhaust gas introduction mechanism, in an exhaust cam that actuates an exhaust valve 68 shown in FIG. 4, an exhaust gas introduction cam profile having a phase angle of approximately 90° is formed in addition to a normal cam profile that opens the exhaust valve 68 during a normal exhaust stroke. The exhaust gas introduction cam profile can be actuated according to an engine operation condition. Thus, as shown in FIGS. 4 and 5, by lifting and opening the exhaust valve 68 by about 1 mm to 3 mm during the intake stroke, the inside of the cylinder 70 and an exhaust system passage 67 (the exhaust passage 13 in FIG. 1) are communicated with each other. As a result, the exhaust gas G is introduced during the intake stroke.

Moreover, an exhaust gas introduction valve using an electromagnetic solenoid to actuate an on-off valve is provided separately from the exhaust valve 68, and a drive signal is given to the electromagnetic solenoid according to the engine operation condition. Thus, by lifting and opening the exhaust gas introduction valve during the intake stroke at the timing as shown in FIG. 5, the inside of the cylinder 70 and the exhaust system passage 67 (the exhaust passage 13) are communicated with each other. As a result, the exhaust gas G is introduced during the intake stroke.

The operation of the exhaust gas introduction mechanism can increase the temperature of an air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat propagated to the exhaust passage 13 is reduced, leading to reduction in heat damage and improvement in durability.

Moreover, an in-cylinder temperature can be quickly increased even at the start-up when the natural gas engine 10 is still cold. Thus, startability is improved. Also, at the start-up of the engine, the engine can be started with a small amount of diesel fuel f. Thus, accidental fires and unburned hydrocarbon emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel f is readily ignited, thus enabling stable ignition with a small amount of diesel fuel. Since stable combustion is performed with a small amount of fuels f and C even during a low load operation region, ride quality (drivability) can be improved while reducing engine vibration. Also, the amount of exhaust gas can be reduced during the low load condition.

Moreover, in the present invention, a $\lambda$ (excess air ratio) sensor 41 is provided on the downstream side of the turbine 15a in the exhaust passage 13 to enable measurement of the excess air ratio $\lambda$ in the exhaust gas G.

Furthermore, a control device 51 called an engine control unit (ECU) is provided to control the diesel fuel injector 69, the CNG jet injector 35, the turbine 15a of the turbo supercharger 15, the intake shutter 17, the EGR valve 20 and the like by receiving signals from various sensors such as an accelerator sensor 52, an engine rotation speed sensor 53 and a coolant temperature sensor (not shown) provided in the engine main body 11, an intake air amount sensor (MAF: not shown) provided in the intake passage 12, the $\lambda$ sensor 41, an exhaust gas temperature sensor (not shown) and an NOx sensor (not shown) provided in the exhaust passage.

Note that, in the configuration shown in FIG. 1, a bypass passage 13a is provided as a bypass of the exhaust passage 13. In the bypass passage 13a, a low-capacity compact continuous regeneration DPF (second DPF) 18d is provided, such as a DPF carrying an oxidation catalyst and a combination of an oxidation catalyst device and a DPF. Also, an exhaust channel switching valve 43 (exhaust channel switching mechanism) for switching the flow of the exhaust gas G between the bypass passage 13a and the exhaust passage 13 is provided in a portion, of the exhaust passage 13, parallel to the bypass passage 13a. The exhaust channel switching valve 43 is controlled by the control device 51. The exhaust gas G passes through the exhaust passage 13 in an opened state of the exhaust channel switching valve 43, and passes through the bypass passage 13a in a closed state thereof, before passing through the compact DPF 18d.

Next, description is given of an operation method for the natural gas engine 10 described above according to the embodiment of the present invention.

The operation method for the natural gas engine is an operation method for the natural gas engine 10 in which the natural gas fuel C is injected into the intake passage 12, the diesel fuel f serving as an ignition source is injected into the cylinder 70, and when igniting the natural gas fuel C, the natural gas fuel C is combusted by compression ignition of the diesel fuel f injected into the cylinder 70 without the use of a spark ignition system, the natural gas engine 10 including an exhaust gas introduction mechanism that introduces the exhaust gas G into the cylinder 70 during an intake stroke. The operation method includes the step of performing control to facilitate ignition of the diesel fuel f by introducing, using the exhaust gas introduction mechanism, the exhaust gas G into the cylinder 70 during the intake stroke.

According to the operation method for the natural gas engine, the operation of the exhaust gas introduction mechanism can increase the temperature of an air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat propagated to the exhaust passage 13 is reduced, leading to reduction in heat damage and improvement in durability.

Figure 6:
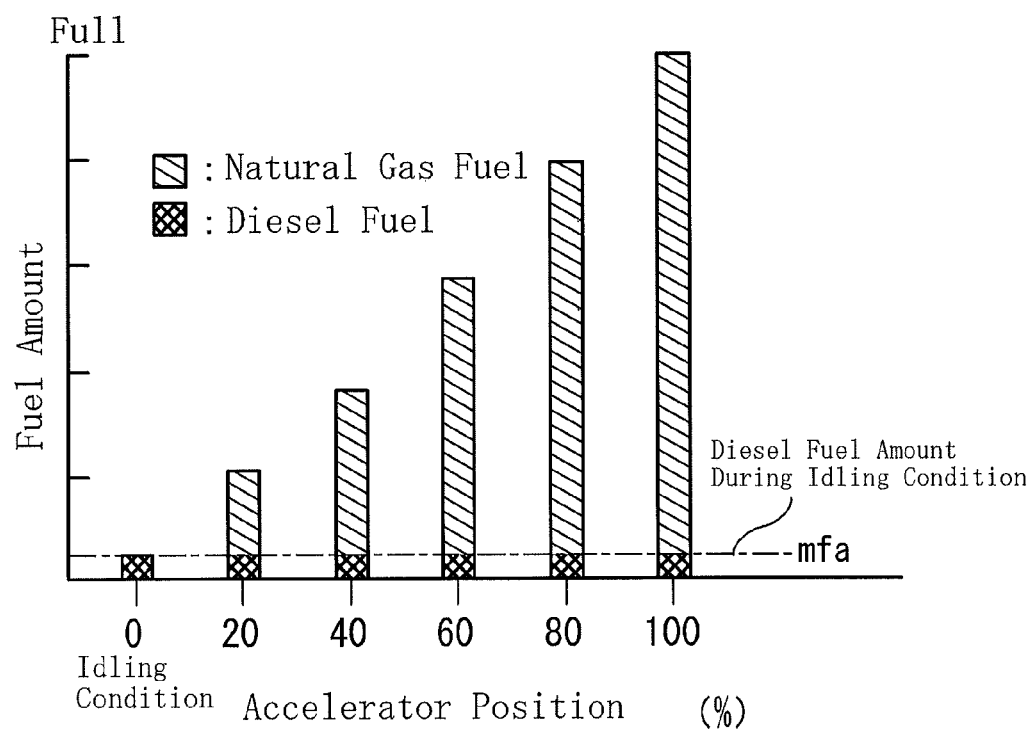
FIG. 6 is a diagram showing a relationship between diesel fuel and natural gas fuel in the operation method according to the present invention.

Furthermore, as shown in FIG. 6, control is performed in which an amount mf of the diesel fuel f injected into the cylinder is set to a diesel fuel amount mfa for idling across the entire operating region except for the start-up of the natural gas engine 10, and engine output is increased or decreased by increasing or decreasing the amount of the natural gas fuel C.

According to the operation method, in the natural gas engine 10 including the exhaust gas introduction mechanism and simultaneously using the diesel fuel f, stable combustion can be maintained in an idling condition. Thus, the use of the combustion of the diesel fuel f for the ignition of the natural gas fuel C enables the natural gas fuel C to be combusted with the minimum amount of intake air and high combustion efficiency through a very simple control in which the diesel fuel amount is constant (mf=mfa) compared with a control in which a ratio of the diesel fuel f to the natural gas fuel C is changed according to the engine operation condition. Accordingly, the exhaust gas temperature can be increased with respect to the ratio of the amount of the fuels f and C. Thus, exhaust gas purification performance of the exhaust gas purification device 18 provided in the exhaust passage 13 can be improved. Note that the valve position of the intake shutter 17 in this case is controlled by measuring the air-fuel ratio, excess air ratio λ and oxygen concentrations in the exhaust gas G, and determining a stoichiometric ratio for stoichiometric combustion.

Moreover, by simultaneously performing intake throttle control using the intake shutter 17 provided in the intake passage 12 and exhaust throttle control using the exhaust shutter 42 provided in the exhaust passage 13 during the operation of the exhaust gas introduction mechanism, the exhaust gas can be allowed to more efficiently flow back into the cylinder 70. As a result, the in-cylinder temperature can be further increased, and the combustion efficiency can be further improved.

In the present invention, the control device (ECU) 51 performs the following operations when a short supply of the natural gas fuel is occurred, when the natural gas engine 10 is in a start-up condition, when the operation condition of the natural gas engine 10 is in a high load region, or when the operation condition of the natural gas engine 10 is in a low load region.

First, when the natural gas fuel C to be injected into the intake passage 12 falls short, control is performed such that the injection of the natural gas fuel C into the intake passage 12 is stopped and the natural gas engine 10 is operated by performing fuel injection of only the diesel fuel f into the cylinder with a fuel amount and injection timing based on diesel combustion data.

Thus, when the natural gas tank 31 for the natural gas fuel C becomes empty, the natural gas engine 10 can be driven as a diesel engine even with only the diesel fuel f, based on the diesel combustion data. Therefore, a vehicle mounting the natural gas engine 10 can move across an area broader than an area where the natural gas fuel C can be supplied. Moreover, even when the natural gas fuel C falls short, the vehicle can move using the diesel fuel f. Thus, even if filling up of the natural gas tank 31 is forgotten, the vehicle can be supplied with the natural gas fuel C by moving to the supply source of the natural gas fuel.

Next, at the start-up of the natural gas engine 10, the natural gas engine 10 is started using only the diesel fuel f. At the start-up, in general, the in-cylinder temperature is low, making it difficult to perform ignition. Thus, by starting the engine using only the diesel fuel f, unburned natural gas fuel C can be prevented from being emitted into the exhaust passage 13. Note that more fuel may be required at the start-up than during idling condition. In such a case, the amount of the diesel fuel f is increased while setting the amount of the natural gas fuel C to zero, as an exception, rather than increasing the amount of the natural gas fuel C.

Figure 7:
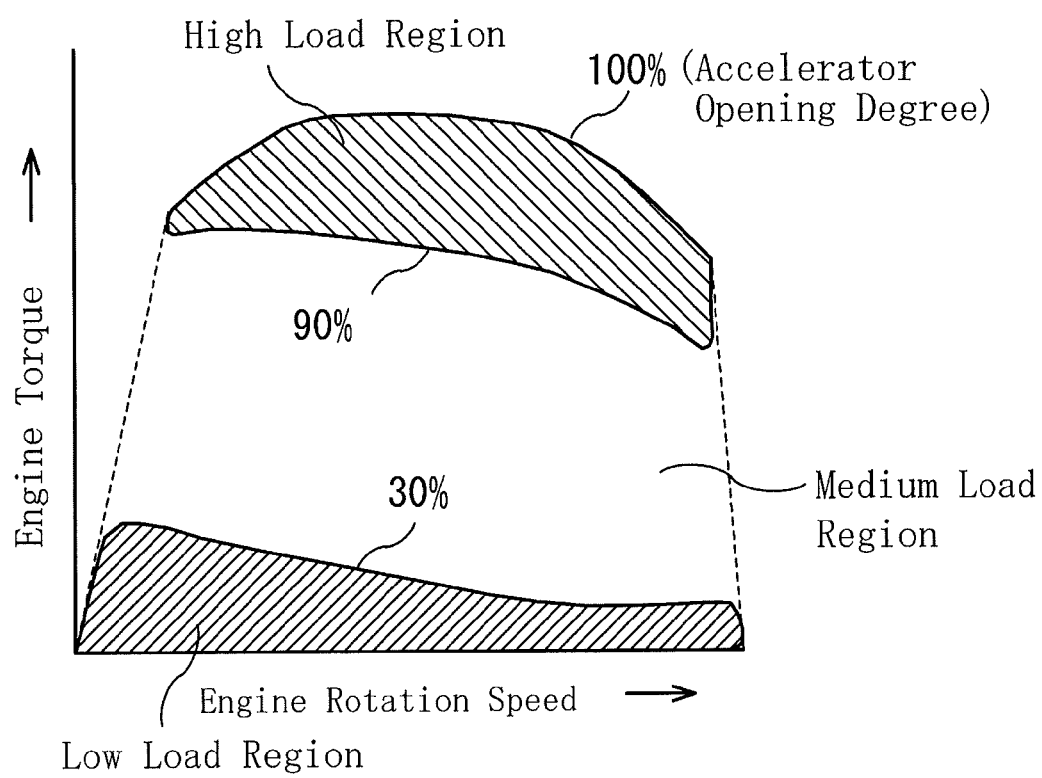
FIG. 7 is a diagram schematically showing a high load region, a medium load region and a low load region in the natural gas engine.

Moreover, in the high load region in which the accelerator opening degree α detected by the accelerator sensor 52 is greater than a preset first opening degree α1, as shown in FIG. 7, fuel injection of the diesel fuel f into the cylinder is performed using multi-injection. Thus, dispersion of the diesel fuel f inside the combustion chamber 64 is improved, and uniform ignition is also performed. Thus, knocking and the like resulting from detonation can be minimized.

Figure 8:
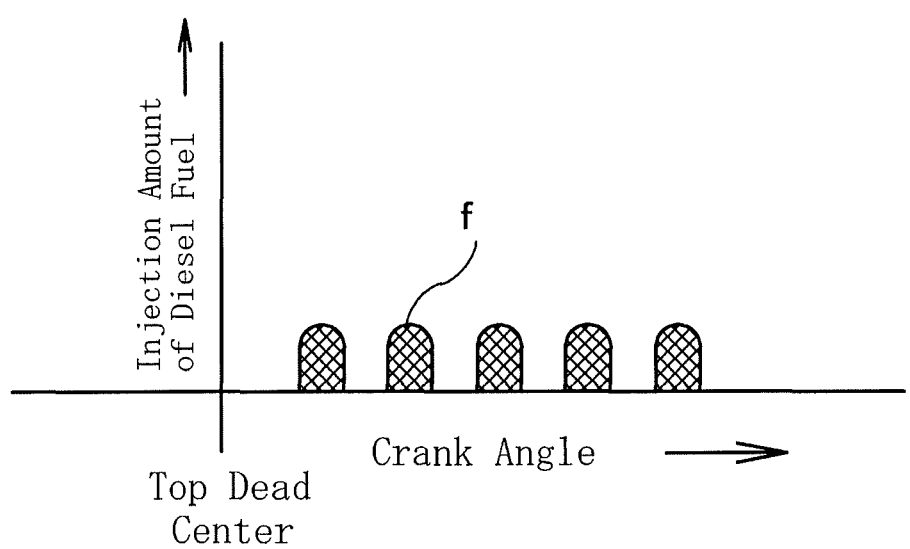
FIG. 8 is a diagram schematically showing an example of multi-injection in fuel injection into a cylinder.
Figure 9:
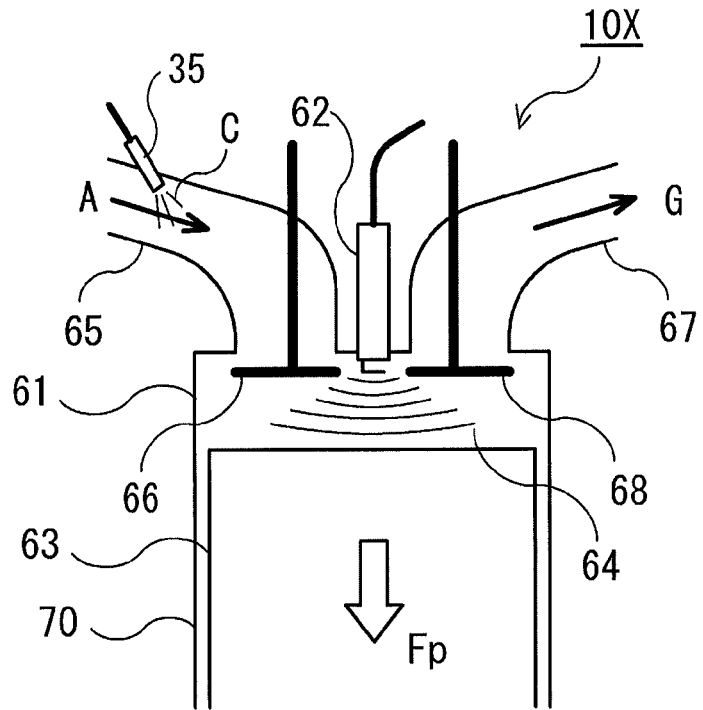
FIG. 9 is a diagram for explaining normal ignition and a combustion state of natural gas fuel in a natural gas engine according to a conventional technology.
Figure 10:
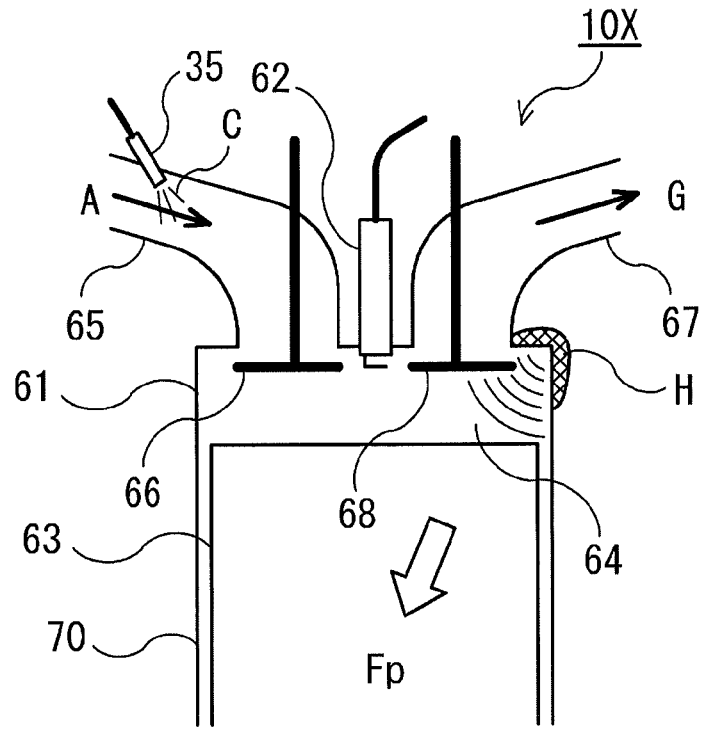
FIG. 10 is a diagram for explaining detonation (abnormal combustion) of the natural gas fuel in the natural gas engine according to the conventional technology.
Figure 11:
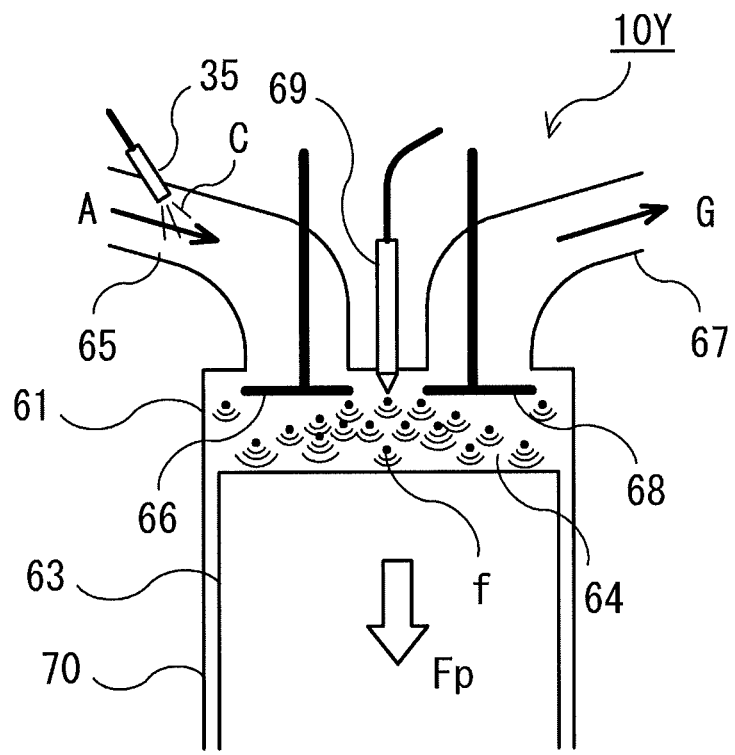
FIG. 11 is a diagram for explaining ignition and a combustion state of fuel in a natural gas engine simultaneously using diesel fuel according to the conventional technology.
Figure 12:
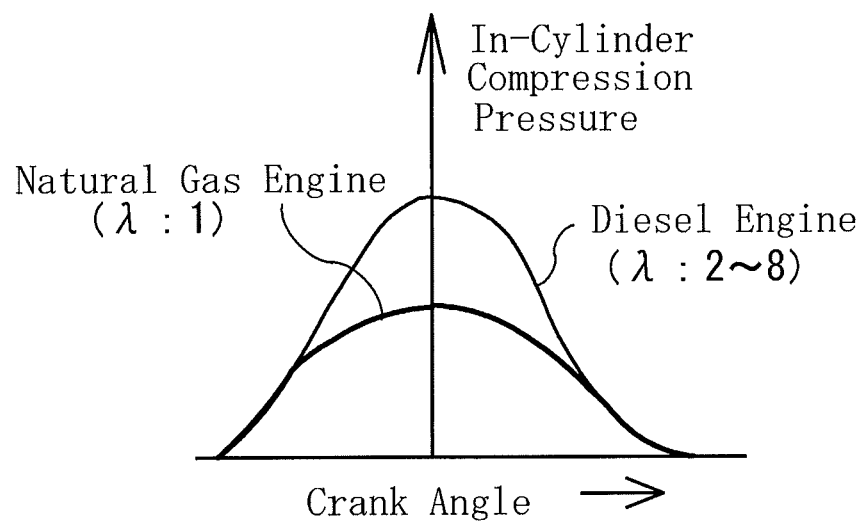
FIG. 12 is a diagram schematically showing comparison between a compression pressure in the natural gas engine and a compression pressure in a general diesel engine.

Note that the first opening degree α1 is a value within a range of 85% to 95%, preferably 90%, of the full opening of of the accelerator opening degree α. Moreover, in the multi-injection, as shown in FIG. 8, approximately the same injection amount is set for every injection, and the number of split injections is set to 2 to 5, preferably 3 to 5.

Furthermore, in the low load region in which the accelerator opening degree α detected by the accelerator sensor 52 is smaller than a preset second opening degree α2, as shown in FIG. 7, control for actuating the exhaust gas introduction mechanism to introduce the exhaust gas G into the cylinder during the intake stroke is performed, and control for narrowing the exhaust shutter 42 provided in the exhaust system passage 13 is performed.

More specifically, in the low load region as shown in FIG. 7, accidental fire (misfire) is likely to occur since the in-cylinder temperature is low. Therefore, control for actuating the exhaust gas introduction mechanism to introduce the exhaust gas G into the cylinder during the intake stroke is performed. Thus, the exhaust gas G can be taken into the cylinder during the intake stroke. At the same time, exhaust throttle control using the exhaust shutter 42 can increase the pressure in the exhaust passage 13 on the upstream side of the exhaust shutter 42. Thus, the exhaust gas G on the exhaust system passage side can readily flow back into the cylinder.

As a result, occurrence of accidental fire can be prevented by increasing the amount of exhaust gas to be taken into the cylinder during the intake stroke and thus increasing the in-cylinder temperature. Note that the second opening degree α2 is a value within a range of 25% to 35%, preferably 30%, of the full opening αf of the accelerator opening degree α.

Also, in the present invention, control for opening and closing the exhaust channel switching valve 43 is performed as follows in parallel with the above operations. In this control, the exhaust channel switching valve 43 allows the exhaust gas G to flow through the bypass passage 13a at the start-up of the natural gas engine 10, during idling condition or in a low load region in which the accelerator opening degree α is smaller than a preset third opening degree α3. In other cases, the exhaust channel switching valve 43 prevents the exhaust gas G from flowing through the bypass passage 13a.

As for the low-capacity DPF 18d for the low load condition provided in the bypass passage 13a, the capacity of the DPF 18d can be reduced to realize a compact size. Therefore, the compact DPF 18d can be disposed in a high-temperature portion closer to the engine main body 11. Thus, the amount of PM generated by diesel combustion in the exhaust gas G emitted into the atmosphere can be reduced. Note that, in a high load operation region with a high exhaust temperature, the exhaust gas G is controlled to pass through a high-capacity DPF 18c with a catalyst on the downstream side, which is provided in the exhaust passage 13, rather than through the bypass passage 13a. Thus, exhaust resistance is small, and soot is purified.

As described above, by selectively using the DPF 18c with a catalyst as a first DPF device and a compact continuous regeneration DPF 18d as a second DPF device, the PM in the exhaust gas G can be more efficiently collected. Note that the third opening degree $\alpha 3$ is a value within a range of 15% to 25%, preferably 20%, of the full opening $\alpha f$ of the accelerator opening degree $\alpha$.

Figure 2:
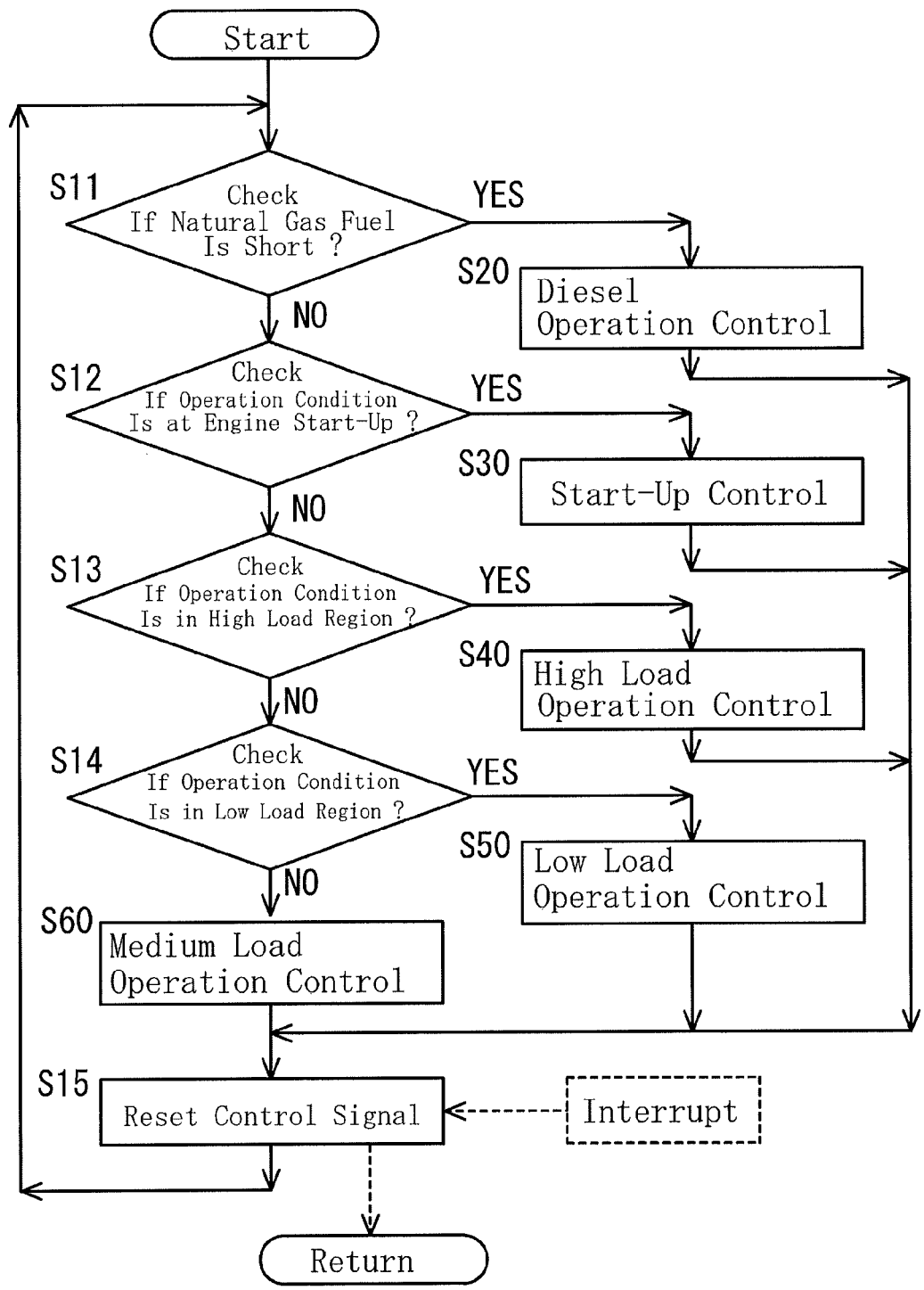
FIG. 2 is a diagram showing an example of a control flow for fuel injection in an operation method for the natural gas engine according to the embodiment of the present invention.

Such control can be carried out through a control flow as illustrated in FIG. 2. Upon instruction from a higher-level control flow, the control flow is started as the natural gas engine 10 is started. Then, when a stop signal for the natural gas engine 10 is inputted, interrupt occurs to return to the higher-level control flow. As the higher-level control flow is stopped, the control flow shown in FIG. 2 is also terminated.

When the control flow shown in FIG. 2 is started, it is determined in Step S11 whether or not the natural gas fuel C is short. When it is determined in Step S11 that the natural gas fuel C is short (YES), the processing moves to diesel operation control of Step S20 to perform control such that the injection of the natural gas fuel C into the intake passage 12 is stopped, and fuel injection of only the diesel fuel f into the cylinder is performed with a fuel amount and injection timing based on diesel combustion data, thereby operating the natural gas engine 10. This diesel operation control is performed for a preset first time (time related to an interval between determination steps) t1, and then the processing moves to Step S15.

On the other hand, when it is determined in Step S11 that the natural gas fuel C is not short, i.e., the natural gas fuel C is sufficient (NO), it is determined in the next Step S12 whether or not the operation condition is at the start-up of the engine. This determination is performed, for example, based on whether or not the engine rotation speed is zero, or the like.

When it is determined in Step S12 that the operation condition is at the start-up of the engine (YES), the processing moves to start-up control of Step S30 to start operating the natural gas engine 10 with only the diesel fuel f. Note that more fuel may be required at the start-up than during idling condition. In such a case, the amount of the diesel fuel f is increased while setting the amount of the natural gas fuel C to zero, as an exception, rather than increasing the amount of the natural gas fuel C. The processing moves to Step S15 after performing the engine start-up control for a second time (time before a preset idling rotation is reached) t2 set by measurement.

On the other hand, when it is determined in Step S12 that the operation condition is not at the start-up of the engine (NO), it is determined in the next Step S13 whether or not the operation condition of the natural gas engine 10 is in a high load region. This determination is performed based on whether or not the accelerator opening degree $\alpha$ is greater than a preset first opening degree $\alpha 1$.

When it is determined in Step S13 that the operation condition is in the high load region (YES), the processing moves to Step S40 to perform control to carry out fuel injection of the diesel fuel f into the cylinder by using multi-injection. Also, the amount of diesel fuel f to be injected into the cylinder is set to the diesel fuel amount for idling, and engine output (engine torque) is increased or decreased by increasing or decreasing the amount of the natural gas fuel C. This high load operation control is performed for a preset third time (time related to an interval between determination steps) t3, and then processing moves to Step S15.

On the other hand, when it is determined in Step S13 that the operation condition is not in the high load region (NO), it is determined in the next Step S14 whether or not the operation condition of the natural gas engine 10 is in a low load region. This determination is performed based on whether or not the accelerator opening degree $\alpha$ is smaller than a preset second opening degree $\alpha 2$.

When it is determined in Step S14 that the operation condition is in the low load region (YES), the processing moves to low load operation control of Step S50 to perform control for actuating the exhaust gas introduction mechanism to introduce the exhaust gas G into the cylinder during the intake stroke and to increase the pressure in the exhaust passage 13 on the upstream side of the exhaust shutter 42 by exhaust throttle control using the exhaust shutter 42. Also, the amount of diesel fuel f to be injected into the cylinder is set to the diesel fuel amount for idling, and the engine output is increased or decreased by increasing or decreasing the amount of the natural gas fuel C. This low load operation control is performed for a preset fourth time (time related to an interval between determination steps) t4, and then processing moves to Step S15.

On the other hand, when it is determined in Step S14 that the operation condition is not in the low load region (NO), the processing moves to medium load operation control of Step S60 to perform control for carrying out fuel injection of the diesel fuel f into the cylinder by using normal injection, for example, pilot injection and main injection. Also, the amount of diesel fuel f to be injected into the cylinder is set to the diesel fuel amount for idling, and the engine output is increased or decreased by increasing or decreasing the amount of the natural gas fuel C. This medium load operation control is performed for a preset fifth time (time related to an interval between determination steps) t5, and then processing moves to Step S15.

In Step S15, the control signal is reset for each operation condition. In other words, the control signal is reset so that the previous control does not affect the subsequent control, during shift among different controls in Steps S20 to S60.

Once Step S15 is completed, the processing returns to Step S11, and Steps S11 to S15 are repeated. Then, if the operation of the natural gas engine 10 is stopped, interrupt occurs to return to the higher-level control flow after Step S15. As the higher-level control flow is completed, the control flow shown in FIG. 2 is also terminated.

Figure 3:
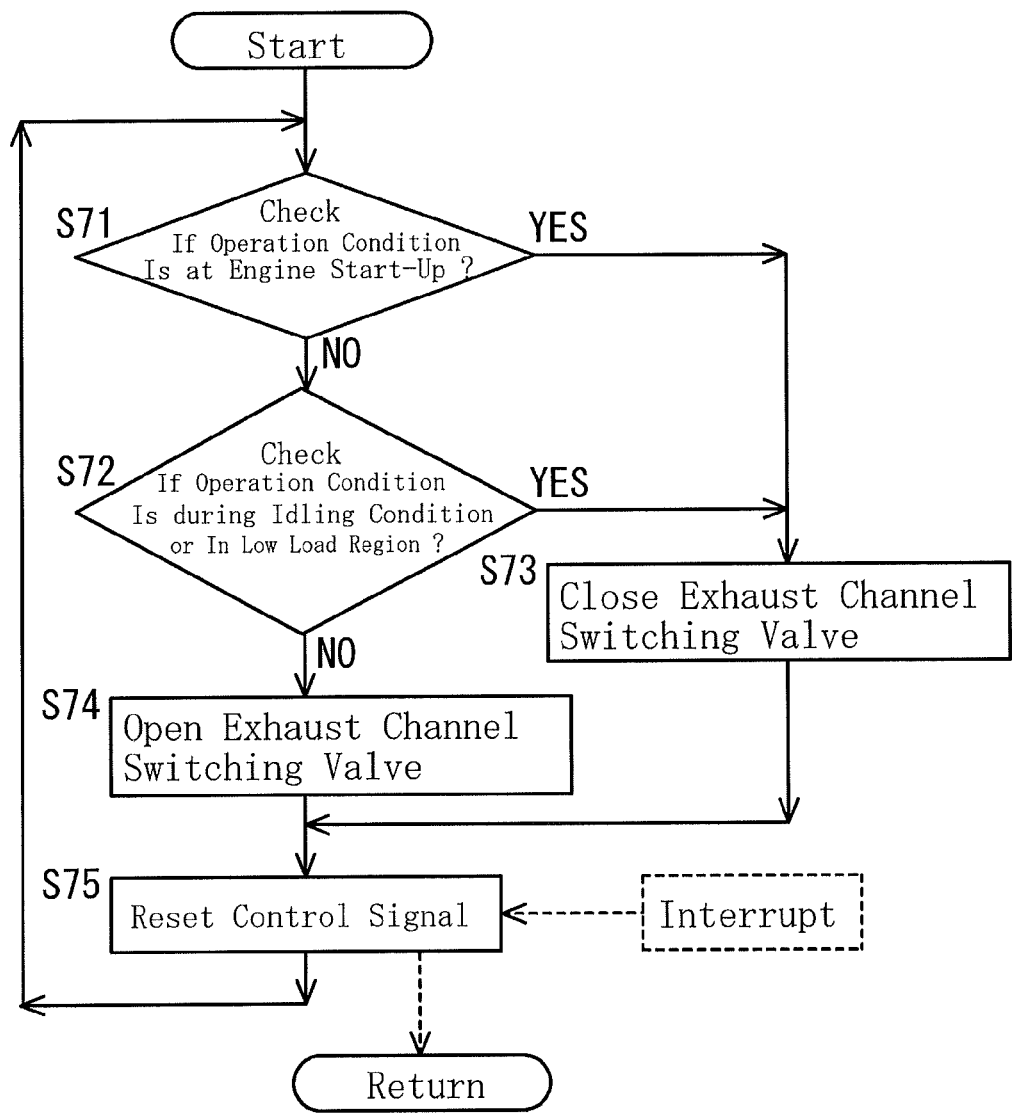
FIG. 3 is a diagram showing an example of a control flow for an exhaust channel switching valve in the operation method for the natural gas engine according to the embodiment of the present invention.

Next, description is given of control of the exhaust channel switching valve 43 related to the bypass passage 13a. This control for opening and closing the exhaust channel switching valve 43 is performed through a control flow as illustrated in FIG. 3. Upon instruction from a higher-level control flow, the control flow is started as the natural gas engine 10 is started. Then, when a stop signal for the natural gas engine 10 is inputted, interrupt occurs to return to the higher-level control flow. As the higher-level control flow is stopped, the control flow shown in FIG. 3 is also terminated. The control flow shown in FIG. 3 is carried out in parallel with the control flow shown in FIG. 2.

As the control flow shown in FIG. 3 is started, it is determined in Step S71 whether or not the operation condition of the natural gas engine 10 is at the start-up of the engine. This determination is performed based on whether or not the engine rotation speed is zero, or the like.

When it is determined in Step S71 that the operation condition is at the start-up of the engine (YES), the processing moves to Step S73 to close the exhaust channel switching valve 43 so that the exhaust gas G flows through the bypass passage 13a. Then, the processing moves to Step S75 after the elapse of a preset predetermined sixth time (time related to an interval between the determinations in Steps S71 and S72) t6.

On the other hand, when it is determined in Step S71 that the operation condition is not at the start-up of the engine (NO), the processing moves to Step S72 to determine whether or not the operation condition of the natural gas engine 10 is during idling condition or in the low load region. This determination is performed based on whether or not the accelerator opening degree α is smaller than a preset third opening degree α3. Note that since the accelerator opening degree α is zero during idling condition, "during idling condition" is included in the determination "α<α3" of the low load region.

When it is determined in Step S72 that the operation condition is during idling condition or in the low load region (YES), the processing moves to Step S73 to close the exhaust channel switching valve 43 so that the exhaust gas G flows through the bypass passage 13a. Then, the processing moves to Step S75 after the elapse of a preset predetermined seventh time (time related to an interval between the determinations in Steps S71 and S72) t7.

On the other hand, when it is determined in Step S72 that the operation condition is neither during idling condition nor in the low load region (NO), the processing moves to Step S74 to open the exhaust channel switching valve 43 so that no exhaust gas G flows through the bypass passage 13a. Then, the processing moves to Step S75 after the elapse of the predetermined seventh time t7.

In Step S75, the control signal is reset for each operation condition. In other words, the control signal is reset so that the previous control does not affect the subsequent control, during shift between different controls in Steps S73 and S74.

Once Step S75 is completed, the processing returns to Step S71, and Steps S71 to S75 are repeated. Then, if the operation of the natural gas engine 10 is stopped, interrupt occurs to return to the higher-level control flow after Step S75. As the higher-level control flow is completed, the control flow shown in FIG. 3 is also terminated.

According to the natural gas engine 10 thus configured and the control method for the natural gas engine, the operation of the exhaust gas introduction mechanism can increase the temperature of the air-fuel mixture of the diesel fuel f, the natural gas fuel C, the intake air A and the exhaust gas G inside the cylinder 70. Thus, stable compression combustion is performed even with a small amount of diesel fuel f, and the natural gas fuel C can also be combusted in a stable manner. Accordingly, stable combustion can be realized. As a result, combustion efficiency is improved, and the amount of the diesel fuel f required for ignition is reduced. Thus, only a small amount of diesel fuel f is required. Moreover, an amount of heat generated by combustion of the fuels f and C is reduced as a whole. As a result, the amount of heat propagated to the exhaust passage 13 is reduced, leading to reduction in heat damage and improvement in durability.

Moreover, the in-cylinder temperature can be quickly increased even at the start-up when the natural gas engine 10 is still cold. Thus, startability is improved. Also, at the start-up of the engine, the engine can be started with a small amount of diesel fuel f. Thus, accidental fires and unburned hydrocarbon emissions during the start-up are also significantly reduced. Furthermore, since the in-cylinder temperature can be quickly increased, smooth acceleration can be achieved.

Furthermore, the use of the exhaust gas introduction mechanism that increases the in-cylinder temperature maintains the in-cylinder temperature at a temperature at which the diesel fuel f is readily ignited, thus enabling stable ignition with a small diesel fuel amount mf. Since stable combustion is performed with a small amount of diesel fuel f even during a low load operation condition, ride quality (drivability) can be improved while reducing engine vibration. Also, the amount of exhaust gas can be reduced during the low load condition.

Furthermore, when the natural gas fuel C falls short, the natural gas engine 10 is operated based on the diesel combustion data using only the diesel fuel f. Therefore, even when the natural gas fuel falls short, a vehicle can move across a broader area using the diesel fuel. Moreover, even the vehicle can move using the diesel fuel f. Thus, even if filling up of the natural gas tank 31 is forgotten, the vehicle can be supplied with the natural gas fuel C by moving to the supply source of the natural gas fuel. At the start-up of the natural gas engine 10, the engine is started using only the diesel fuel. Thus, unburned natural gas fuel can be prevented from being emitted into the exhaust system passage.

Moreover, in the high load region in which the accelerator opening degree α is greater than the preset first opening degree α1, fuel injection of the diesel fuel f into the cylinder is performed using multi-injection. Thus, dispersion of the diesel fuel f inside the combustion chamber 64 is improved, and uniform ignition is also performed. Thus, knocking and the like resulting from detonation can be minimized.

Furthermore, in the low load region in which the accelerator opening degree α is smaller than the preset second opening degree α2, control for actuating the exhaust gas introduction mechanism to introduce the exhaust gas G into the cylinder during the intake stroke is performed, and control for narrowing the exhaust shutter provided in the exhaust system passage is performed. As a result, occurrence of accidental fire can be prevented by increasing the amount of exhaust gas to be taken into the cylinder during the intake stroke and thus increasing the in-cylinder temperature.

Furthermore, the exhaust channel switching valve 43 is closed to allow the exhaust gas G to flow through the bypass passage 13a at the start-up of the natural gas engine 10, during idling condition or in the low load region in which the accelerator opening degree α is smaller than the preset third opening degree α3. In other cases, the exhaust channel switching valve 43 is opened to prevent the exhaust gas G from flowing through the bypass passage 13a. By selectively using the compact continuous regeneration DPF device 18d and the DPF device 18c with a catalyst, the PM in the exhaust gas can be more efficiently collected.

According to the natural gas engine and the operation method for the natural gas engine according to the present invention, the operation of the exhaust gas introduction mechanism can increase the temperature of the air-fuel mixture of diesel fuel, natural gas fuel, intake air and exhaust gas inside the cylinder. Thus, stable compression combustion is performed even with a small diesel fuel amount, and the natural gas fuel can also be combusted in a stable manner. Accordingly, stable combustion can be realized. In addition, knocking resulting from detonation can be minimized even when the engine operation condition is in a high load region.

As a result, combustion efficiency is improved, and the amount of diesel fuel required for ignition is reduced. Thus, only a small amount of diesel fuel is required. Moreover, an amount of heat generated by combustion of the fuels is reduced as a whole. As a result, the amount of heat propagated to the exhaust passage is reduced, leading to reduction in heat damage and improvement in durability. Therefore, the natural gas engine and the operation method for the natural gas engine according to the present invention can be used for many vehicle-mounted natural gas engines and an operation method for the natural gas engines.

The invention claimed is:

1. A natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without a spark ignition system, comprising:
    an exhaust gas introduction mechanism that introduces exhaust gas into the cylinder during an intake stroke by allowing the exhaust gas to flow back into the cylinder by opening an exhaust valve; and
    an electronic controller configured to—
        set an amount of the diesel fuel to be injected into the cylinder to a diesel fuel amount for idling across an entire operating region of the natural gas engine except for at a start-up of the natural gas engine,
        increase or decrease engine output by increasing or decreasing, respectively, an amount of the natural gas fuel, and
        inject the diesel fuel into the cylinder using multi-injection in a high load region in which an accelerator opening degree is greater than a preset first opening degree,
    wherein in a low load region in which the accelerator opening degree is smaller than a preset second opening degree, the electronic controller actuates the exhaust gas introduction mechanism to introduce the exhaust gas into the cylinder during the intake stroke, and narrows an exhaust shutter provided in an exhaust system passage.

2. The natural gas engine according to claim 1, wherein the electronic controller is further configured to, when a supply of the natural gas fuel to be injected into the intake system passage is insufficient to operate the engine, stop the injection of the natural gas fuel into the intake system passage and perform injection of only the diesel fuel into the cylinder with a diesel fuel amount and injection timing based on diesel combustion data.

3. The natural gas engine according to claim 2, wherein the electronic controller is further configured to, at the start-up of the natural gas engine, start the natural gas engine using only the diesel fuel.

4. The natural gas engine according to claim 2, wherein a bypass passage is provided in the exhaust system passage,
    a first diesel particulate filter device is disposed in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter,
    a second diesel particulate filter device is disposed in the bypass passage, the second diesel particulate filter device including a diesel particulate filter carrying an oxidation catalyst or a continuous regeneration diesel particulate filter obtained by combining an oxidation catalyst device and a diesel particulate filter,
    an exhaust channel switching valve is provided to switch a flow of the exhaust gas between the bypass passage and the exhaust system passage,
    wherein the electronic controller is further configured to control the exhaust channel switching valve to allow the exhaust gas to flow through the bypass passage at the start-up of the natural gas engine, during idling condition or in a low load region in which the accelerator opening degree is smaller than a preset third opening degree, and, in other cases, to prevent the exhaust gas from flowing through the bypass passage.

5. The natural gas engine according to claim 1, wherein the electronic controller is further configured to, at the start-up of the natural gas engine, start the natural gas engine using only the diesel fuel.

6. The natural gas engine according to claim 5, wherein a bypass passage is provided in the exhaust system passage as a bypass of the exhaust system passage,
    a first diesel particulate filter device is disposed in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter,
    a second diesel particulate filter device is disposed in the bypass passage, the second diesel particulate filter device including a diesel particulate filter carrying an oxidation catalyst or a continuous regeneration diesel particulate filter obtained by combining an oxidation catalyst device and a diesel particulate filter, and
    an exhaust channel switching valve is provided to switch a flow of the exhaust gas between the bypass passage and the exhaust system passage,
    wherein the electronic controller is further configured to control the exhaust channel switching valve to allow the exhaust gas to flow through the bypass passage at the start-up of the natural gas engine, during idling condition or in a low load region in which the accelerator opening degree is smaller than a preset third opening degree, and, in other cases, to prevent the exhaust gas from flowing through the bypass passage.

7. The natural gas engine according to claim 1, wherein a bypass passage is provided in the exhaust system passage,
    a first diesel particulate filter device is disposed in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter,
    a second diesel particulate filter device is disposed in the bypass passage, the second diesel particulate filter device including a diesel particulate filter carrying an oxidation catalyst or a continuous regeneration diesel particulate filter obtained by combining an oxidation catalyst device and a diesel particulate filter, and an exhaust channel switching valve is provided to switch a flow of the exhaust gas between the bypass passage and the exhaust system passage, wherein the electronic controller is further configured to control the exhaust channel switching valve to allow the exhaust gas to flow through the bypass passage at the start-up of the natural gas engine, during idling condition or in a low load region in which the accelerator opening degree is smaller than a preset third opening degree, and, in other cases, to prevent the exhaust gas from flowing through the bypass passage.

8. An operation method for a natural gas engine in which natural gas fuel is injected into an intake system passage, diesel fuel serving as an ignition source is injected into a cylinder, and when igniting the natural gas fuel, the natural gas fuel is combusted by compression ignition of the diesel fuel that has been injected into the cylinder without a spark ignition system, comprising:

introducing exhaust gas into the cylinder during an intake stroke by allowing the exhaust gas to flow back into the cylinder by opening an exhaust valve, setting an amount of the diesel fuel to be injected into the cylinder to a diesel fuel amount for idling across an entire operating region of the natural gas engine except for at a start-up of the natural gas engine, increasing or decreasing engine output by increasing or decreasing, respectively, an amount of the natural gas fuel, and injecting the diesel fuel into the cylinder by using multi-injection in a high load region in which an accelerator opening degree is greater than a preset first opening degree, in a low load region in which the accelerator opening degree is smaller than a preset second opening degree, introducing the exhaust gas into the cylinder during the intake stroke, and narrowing an exhaust shutter provided in an exhaust system passage.

9. The operation method for a natural gas engine, according to claim 8, further comprising:

when a supply of the natural gas fuel to be injected into the intake system passage is insufficient to operate the natural gas engine, stopping the injection of the natural gas fuel into the intake system passage and operating the natural gas engine by performing fuel injection of only the diesel fuel into the cylinder with a diesel fuel amount and injection timing based on diesel combustion data.

10. The operation method for a natural gas engine, according to claim 9, further comprising:

starting the natural gas engine using only the diesel fuel at the start-up of the natural gas engine.

11. The operation method for a natural gas engine, according to claim 9, further comprising:

providing a bypass passage in the exhaust system passage, disposing a first diesel particulate filter device in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter, disposing a second diesel particulate filter device in the bypass passage, the second diesel particulate filter device including a diesel particulate filter carrying an oxidation catalyst or a continuous regeneration diesel particulate filter obtained by combining an oxidation catalyst device and a diesel particulate filter, providing an exhaust channel switching valve to switch a flow of the exhaust gas between the bypass passage and the exhaust system passage, and performing control such that the exhaust channel switching valve allows the exhaust gas to flow through the bypass passage at the start-up of the natural gas engine, during idling condition or in a low load region in which the accelerator opening degree is smaller than a preset third opening degree, and, in other cases, prevents the exhaust gas from flowing through the bypass passage.

12. The operation method for a natural gas engine, according to claim 8, further comprising:

starting the natural gas engine using only the diesel fuel at the start-up of the natural gas engine.

13. The operation method for a natural gas engine, according to claim 12, further comprising:

providing a bypass passage in the exhaust system passage, disposing a first diesel particulate filter device in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter, disposing a second diesel particulate filter device in the bypass passage, the second diesel particulate filter device including a diesel particulate filter carrying an oxidation catalyst or a continuous regeneration diesel particulate filter obtained by combining an oxidation catalyst device and a diesel particulate filter, providing an exhaust channel switching valve to switch a flow of the exhaust gas between the bypass passage and the exhaust system passage, and performing control such that the exhaust channel switching valve allows the exhaust gas to flow through the bypass passage at the start-up of the natural gas engine, during idling condition or in a low load region in which the accelerator opening degree is smaller than a preset third opening degree, and, in other cases, prevents the exhaust gas from flowing through the bypass passage.

14. The operation method for a natural gas engine, according to claim 8, further comprising:

providing a bypass passage in the exhaust system passage, disposing a first diesel particulate filter device in the exhaust system passage on a downstream side of a junction of the bypass passage and the exhaust system passage, the first diesel particulate filter device including a diesel particulate filter carrying an oxidation catalyst or a continuous regeneration diesel particulate filter obtained by combining an oxidation catalyst device and a diesel particulate filter, disposing a second diesel particulate filter device in the bypass passage, the second diesel particulate filter device including a diesel particulate filter carrying an oxidation catalyst or a continuous regeneration diesel particulate filter obtained by combining an oxidation catalyst device and a diesel particulate filter, providing an exhaust channel switching valve to switch a flow of the exhaust gas between the bypass passage and the exhaust system passage, and performing control such that the exhaust channel switching valve allows the exhaust gas to flow through the bypass passage at the start-up of the natural gas engine, during idling condition or in a low load region in which the accelerator opening degree is smaller than a preset third opening degree, and, in other cases, prevents the exhaust gas from flowing through the bypass passage.

* * * * *